Sept. 30, 1969  J. J. P. BERNARD  3,470,092
SYSTEM FOR THE PURIFICATION OF WASTE WATERS
Filed May 8, 1967  2 Sheets-Sheet 1

INVENTOR
Jacques Joseph Paul Bernard

BY Tourover & Browdy
ATTORNEY

INVENTOR
Jacques Joseph Paul Bernard

BY Tourover & Browdy

ATTORNEY

United States Patent Office 3,470,092
Patented Sept. 30, 1969

3,470,092
SYSTEM FOR THE PURIFICATION OF WASTE WATERS
Jacques Joseph Paul Bernard, Port-Marly, France, assignor to Degremont S.A., Suresnes, Hauts-de-Seine, France, a corporation of France
Filed May 8, 1967, Ser. No. 636,727
Int. Cl. C02c *1/06, 5/04*
U.S. Cl. 210—15                                         9 Claims

ABSTRACT OF THE DISCLOSURE

A system for the purification of waste waters based on the activated sludge process utilizing an aeration zone and a settling zone which are interconnected with means for periodically reversing operation so that the aeration zone becomes the settling zone and vice versa.

---

Figure 1:
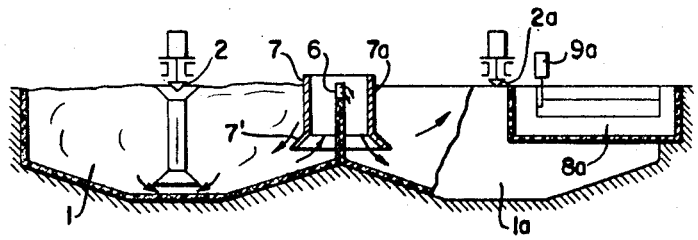

The present invention relates to the purification of waste waters and more particularly to a novel process and apparatus based on the activated sludge process utilizing alternate aeration and settling zones without the requirement for auxiliary pumping to recirculate settled sludge.

To obtain satisfactory operation and results in an installation for purifying waste water in a small to medium sized collecting system, it is necessary to consider particularly the following requisites:

The purification installation must be able to cope with instantaneous overloads due to large increases of both flow and pollution rate caused by the limited scope of the collection system which is unable to spread the peak overflows over a longer period of time.

The management of clarifying units must be very simple and only require semi-skilled, part-time labor in view of the fact that management personnel is usually quite scarce in small localities.

To these basic requirements of safety and simplicity must be added conditions which are secondary in nature but are of growing imporatnce in our present civilization, namely:

The purification installations must have simple architectural lines and must be easy to conceal from view. Further, there must be no nauseating odors resulting from the operation.

The activated sludge process with a light load or "total oxidation," in which the quantity of nutrient supplied to living cells, making up the purifying bacterial flora, is relatively small, is responsible for the great progress made in the design of these treatment plants. Utilizing this process, where the capacity of units is over-sized providing large amounts of activated sludge, there are no longer overloads even at peak hours. The microorganisms mass available is always much more than what is necessary for the adsorption of organic matters contained in the raw water.

Also the microorganisms present in the unit are always in the endogenous phase. Organic matter polluting the water is not only adsorbed but the cells actually synthesize it into protoplasma with the result that the activated sludge is mostly made up of oxidated residues of the cellular material. This activated sludge is strongly mineralized, stabilized and can be taken directly to straining beds for drying.

Considering that the raw water retention time in the installation is quite high, often more than 24 hours, degradable solid content in the effluent, continually stirred up, undergoes physical destruction allowing it to be assimilated by the microorganisms. It becomes possible then to eliminate the conventional pre-setting of raw effluent; thus, a purification installation is then reduced to two components:

(1) The aeration tank where oxygen necessary to bacterial flora development and consequent water purification is introduced;

(2) The settling tank where the clear water is separated from the mass of the floc, or biological floc.

However provision must be made for recirculating the sludge which has settled on the settling tank bottom to the aeration tank. This operation requires a pump. A solution has been found avoiding this inconvenience. Combined units are provided in which aeration and settling zones are within the same walls and are in continual hydraulic communication. In these units settled sludges are returned to the aeration zone without additional energy other than that required by the aeration step.

A safe operation of these oxidation units requires the utilization of an aerating system which requires two fundamental conditions:

To have an oxygenation capacity absolutely constant in time and not subject to clogging due to papers, fibers, etc. inevitably carried in the raw water. Partial clogging or deposits result in a decrease of the amount of oxygen introduced in the system and result in a deteriorating and even complete stoppage of the purification.

To have the oxygenation capacity (quantity of oxygen introduced per energy unit) as high as possible compatible with the preceding criteria, so as to require a minimum of energy consumption.

Accordingly it is an object of the present invention to provide a novel installation utilizing the activated sludge process under total oxidation.

Figure 1A:
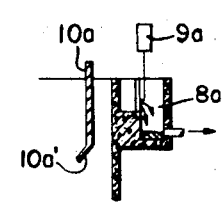
Figure 2:
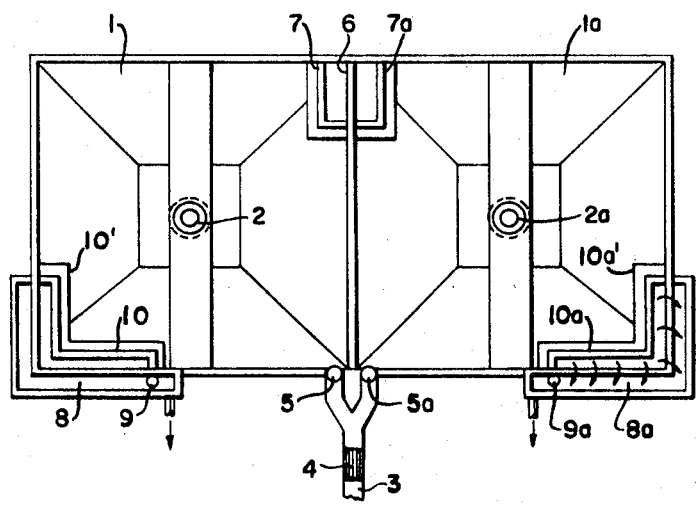
Figure 3:
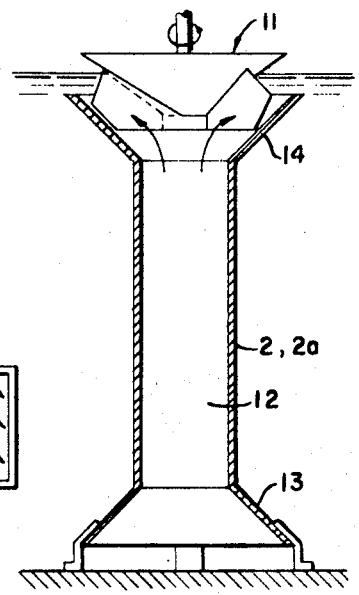
Figure 5:
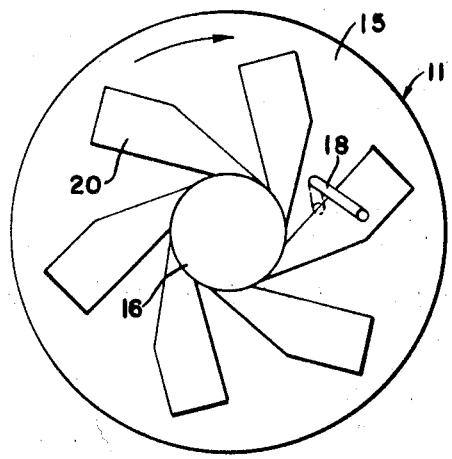
Figure 4:
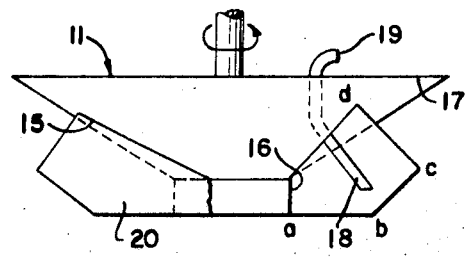
Figure 6:
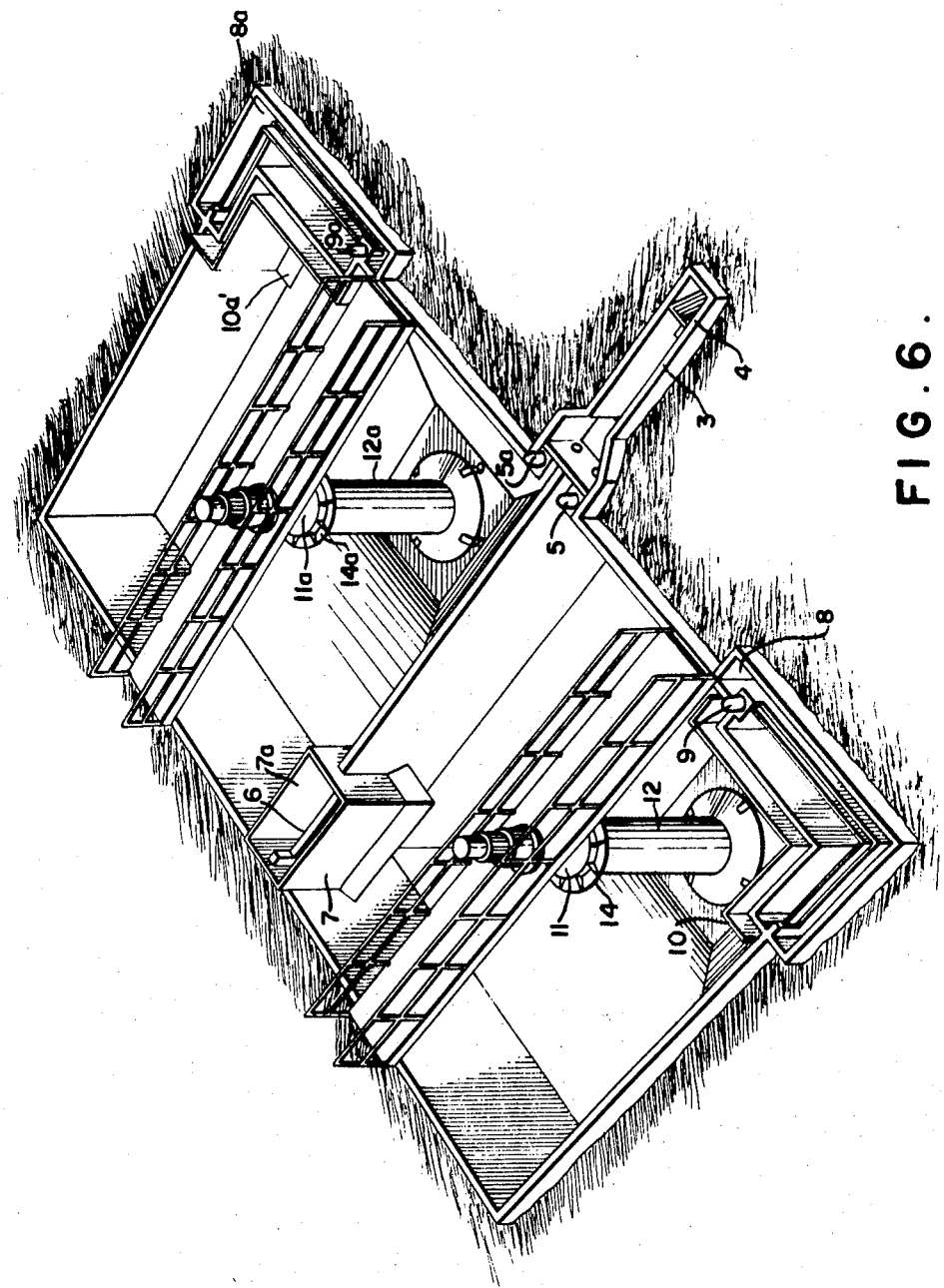

In the following description reference is made to the attached drawings in which:

FIG. 1 is an elevational view of the installation;
FIG. 1a is a detail from FIG. 1;
FIG. 2 is a plan view corresponding to FIG. 1;
FIG. 3 is an elevational view partly in section of the combined stirring and aerating means;
FIG. 4 is an elevational view of the upper part of this means;
FIG. 5 is a plan view from underneath corresponding to FIG. 4; and
FIG. 6 is a perspective view of the installation.

According to an essential characteristic of the invention, the installation includes two identical tanks 1 and 1a each equipped at its center with an aeration and stirring system 2 and 2a, these two tanks communicating between themselves and each functioning alternatively and reciprocally as the aeration tank and the settling tank.

Among the advantages inherent in such an installation, the following can be listed:

Simplification and reduction of construction cost; the purification installation comprising two identical units in the shape of tanks with shallow depth and simple forms; the elimination of all pumping systems for recirculating settled sludges towards the aeration zone.

Total operating safety through utilization of mechanical aerators made in such fashion as to avoid any clogging and to reduce their oxygenating power in time. Simplification of the system through automation of the various mechanical equipment composing the installation.

Referring to the drawings the identical purifying tanks 1 and 1a have four equal sides and a bottom in the form of a truncated pyramid having very little slope. The two tanks are fed with raw water to be treated passing through inlet 3, and thence through a bar screen 4. Downstream from the screen 4 are two motorized valving devices 5 and 5a provided with automatic controls so that one is closed while the other is open. The valving devices provide for feeding raw water into either tank 1 or 1a. Tanks 1 and 1a are interconnected through a weir 6 surrounded by deflecting baffles 7 and 7a located in each of the tanks and partially submerged into the water with their upper part above the normal water level. The two baffles together are shaped as a chimney and have a deflector 7' at their lower end which directs the material stirred up by the aerator towards the center of the tank.

The tanks 1 and 1a each have an outlet 8 and 8a respectively located diagonally across the tank from the weir 6. These outlets shown in FIG. 1a are in the form of an elongated overflow into a receiving well controlled by a mechanically operated valve 9 and 9a. Siphonoid dividers 10 and 10a are partially immersed in the water inwardly of the outlets. The siphonoid dividers 10, 10a are equipped with deflectors 10' and 10a' at their lower ends and act to prevent entrainment into the outlet of undestroyed floating matter which has been passed through the installation and act to avoid an accumulation of such matter at the outlet of the tank functioning as aerator.

The mechanical aerator 2–2a is located at the center of each tank, and, as shown in FIGS. 3–5, includes an agitator unit 11 having a vertical axis at the upper end of a recirculation column 12. The agitator is driven by a reducing gear motor assembly. The column 12 is set vertically on four standards slightly above the floor of the tank to permit the entrance of the water into the column from the bottom thereof. The lower end 13 and upper end 14 of the column 14 are funnel shaped having a small slope of approximately 30°. The upper end is flush with the normal water level. The agitator unit 11 functions both as a pump and disperser. The contents of the tank are strongly stirred, and periodically pass through the agitator which draws up the liquor from the bottom of the tank where the strong sweeping effect is created thus avoiding any stagnation or settling of the suspended matters.

The agitator unit 11 is made up in the shape of a truncated cone portion 15 terminated at its lower end in a short hollow cylinder 16 having a diameter of between about 20–30% of the upper diameter of the truncated cone. The agitator unit can float on the water which is quite helpful when installing or dismantling it. The motor-reducer assembly drive has only to bear a small vertical load. The cylinder 16 is designed to direct water flow towards the leading edge of blades 20 mounted on the cone portion 15.

On the under surface of each blade 20 near the maximum low pressure point, a pipe 18 is attached passing through the agitator and ending with an elbow 19 above the upper end 17 of the cone portion. The shape of elbow 19 as well as the lower end of the pipe 18 are designed to induce the maximum amount of air flow within the liquid mass flowing through the agitator unit.

The leading edge ab of blades 20 is horizontal and is on the same plane as the base of the cylinder 16, with blade width increasing from the center outwardly. This design gives the water a horizontal component as soon as it enters the agitator, preventing fibers and other matter from being caught on the blades and reducing the through-flow section of the agitator unit. Blade edge bc is located at a constant distance from the cone 15 and is set a few millimeters from it to avoid a by-passing of the flow pumped by the agitator unit towards the inside of the column.

This design avoids using any type of flange outside of the agitator unit, giving it an open wheel configuration reducing clogging risk to a minimum.

The rear edge upper extremity of the blades d is located below the truncated cone upper edge 17, which is above water level.

The agitator is mounted so that the blades are halfway under water. This makes it possible to draw a large volume of water through the column 12 and to project it in sheets above the surface of the water. The contact between these sheets of water and the atmosphere as well as the intense turbulence created on the surface of the tank dissolves a large quantity of oxygen within the mass of the liquid. This configuration allows for an increase of the amount of oxygen introduced into the liquid for the same horsepower. It also insures a total stabilization of the hydraulic system.

The functioning of the assembly just described is as follows:

The tanks alternatively act as the aeration tank and then as the settling tank. Assuming that tank 1 is the aeration zone and tank 1a the settling zone, valve 5 is open, valve 5a is closed, aerator 2 is active, aerator 2a stopped, valve 9 is closed, valve 9a is open.

The raw water enters tank 1 through valve 5. Aerator 2 accomplishes the agitating and aerating of the contents of tank 1 and causes a violent contact between the raw water to be treated and the activated sludge contained in it. Tank 1 effluent composed of a mixture of activated sludge and clear water passes into tank 1a through weir 6 after going through a pre-settling in chimney 7.

Separation between the purified effluent and the activated sludge is realized in tank 1a. The sludge whose activity has decreased because of its high mineralization proportion slowly continues its endogenous activity using up the large oxygen reserve collected in tank 1 where aeration is intense.

The purified and clarified water leaves tank 1a through exit 8a. The weir edge on the overflow is quite low so that the approaching water velocity is very slow. Since tank 1a has a very small rise rate of only a few tens of centimeters per hour because of the large horizontal area of the tank, the clarification realized is excellent.

As the sludge activated liquor from tank 1 flows over to tank 1a, the concentration in tank 1 slowly decreases. When this concentration reaches a limiting value beyond which purification is not complete, the process is reversed and the following operations take place automatically.

Aerator 2 stops. After a specific length of time which may be ½ hour for tanks with a retention time of the order of 24 hours, tank 1 is still and the sludge it contains has settled. Valve 5 closes and the valve 5a opens. Valve 9a closes and valve 9 opens. Then the feeding process is reversed between the two tanks. Tank 1a now functions as the aeration tank and tank 1 as the settling tank.

The short dead time of ½ hour to one hour during which the two aerators 2 and 2a are both stopped is not detrimental to the quality of the treatment because the large volume of both tanks (corresponding to a retention time of 24 hours) which allows for stopping the large variations of the mean characteristics of interstitial wafer from the activated sludge liquor contained in them. Further, the raw water inlet in tank 1 is quite far from weir 6 and outlet 8a.

A fast calculation can be made to give the concentration variations of the activated sludge liquor in the aeration tank.

C is the dry matter concentration of the activated sludge liquor in the aeration tank;

V is the volume of the aeration tank;

Q is the volume of raw water coming out of the aeration tank;

$t$ is the time elapsed.

The aeration tank effluent has less concentration than concentration C because of the presettling taking place in chimney 7 preceding weir 6 over which the water overflows. Because of this we can assume that the effluent concentration is only $\tfrac{2}{3}$C.

Taking the balance of the amount of dry matter of the system and ignoring dry matter added by the raw water, we have:

$$V.dC = -Q\frac{2C}{3} dt$$

$$\frac{dC}{C} = -\frac{2Q}{3V} dt$$

$$C_t = C_0 - \frac{2Q}{3V} t$$

$C_0$ being the dry matter concentration at time $t_0$ and $C_t$ being dry matter concentration at time $t$.

Knowing the average flow Q, the tank volume and the initial activated sludge concentration in the tank, it is possible to determine the length of time $t$ while the tank is operating between two reversals of operation, so that the concentration in the aeration tank does not become lower than a fixed value.

In practice, for a tank capacity V corresponding to a retention time of the order of 10 hours, it can be seen that if one chooses a variation of 3 to 5 g./l. for the activated sludge concentration in the tank, the duration of each cycle will be about 8 hours. The design rate will then give three daily cycle inversions of the functioning of the two tanks making up the purification installation.

By equipping pipes 18 jointly or singly with control valves, the air flow can be adjusted simultaneously allowing for an easy control of the energy required. Power requirements decrease as the amount of air introduced increases.

It will be obvious to those skilled in the art that various changes may be made without departing from the spirit of the invention and therefore the invention is not limited to what is shown in the drawings and described in the specification, but only as indicated in the appended claims.

What is claimed is:

1. In a plant for treating sewage and the like by the aerobic-activated sludge process comprising an aeration zone, a settling zone, and aeration and agitation means in the aeration zone, the improvements, comprising:

first and second essentially identical tanks each at the same horizontal level having a relatively shallow side wall and a bottom wall, said bottom wall sloping genty toward the center of each said tank, each said tank being provided with a said aeration and agitation means;

means to feed sewage to each said tank;

means located away from said entrance means to interconnect said two tanks with one another above the normal quiescent water level to permit the flow of water and activated sludge therebetween when the water and sludge level in one of the tanks exceeds the normal quiescent water level;

water exit means from each said tank, each said exit means being located at about the normal quiescent water level and at a location away from said entrance means and said interconnecting means; and means to operate said plant cyclically (1) to provide said aerating zone in only said first of said two tanks by operating said aeration and agitation means therein during a first period while simultaneously said settling zone is provided in only said second of said two tanks, (2) to provide a short dead time and (3) to provide said aerating zone in only said second of said two tanks by operating said aeration and agitation means therein while said settling zone is only in said first of said two tanks during a second period, said means to operate the plant cyclically including entrance valve means at each said sewage entrance means for opening one said entrance means while the other is closed, exit valve means at each said water exit for opening one said exit while the other is closed, and means to independently operate one said aeration and agitation means while the other said aeration and agitation means is maintained unoperated.

2. Apparatus according to claim 1 wherein said interconnecting means comprises a communicating weir preceded by a baffle forming a pre-settling zone.

3. Apparatus according to claim 2 wherein said baffle has a deflector at its lower end for deflecting flow back toward the center of said aerating zone.

4. Apparatus according to claim 1 wherein said aeration and agitation means includes an agitator unit floating in the water and comprising a hollow truncated cone with the large edge extending upwardly and a hollow cylinder at the lower end and blades mounted on the lower edge of said cone portion.

5. Apparatus according to claim 4 wherein the leading edge of said blades is horizontal.

6. Apparatus according to claim 4 wherein air intakes are mounted on said agitator unit for conveying air from over the water level to the under side of the blades while the unit is rotating.

7. Apparatus according to claim 4 wherein air intakes are mounted on said blades at their lower ends, pass through said cone portion and extend upwardly above the upper edge of said cone portion for conveying air to the under side of the blades while the unit is rotating.

8. An activated sludge waste water purification method comprising establishing a system comprising a first and second tank of identical design, means for hydraulically interconnecting the tanks, aerating means mounted in each tank, means for directly feeding waste water to be treated into either said first tank or said second tank, and outlet means from each said tank, (a) feeding waste water to be treated into one of said tanks while maintaining the feeding means to the other said tank closed, (b) actuating the aerating means in the one said tank while maintaining the aerating means in the other said tank inoperative, (c) permitting flow of treated waste water from the one said tank into the other said tank through the hydraulic interconnecting means, (d) permitting sludge to settle from the waste water in the other said tank, (e) providing a short dead time during which time both aerating means are stopped, (f) then opening the feeding means to the other said tank to feed waste water to be treated to the other said tank and closing the feeding means to the one said tank, (g) actuating the aerating means in the other said tank and deactivating the aerating means in the one said tank, (h) permitting flow of treated waste water from the other said tank to the one said tank, (i) permitting sludge to settle from the waste water in the one said tank,
then repeating steps (a) to (i) set forth above.

9. A method in accordance with claim 8 wherein the method sequence is carried out automatically.

References Cited

UNITED STATES PATENTS 3,382,981  5/1968  Hampton _____ 210—220 X

FOREIGN PATENTS 17,463  1915  Great Britain.
862,761  3/1961  Great Britain.

OTHER REFERENCES

Keefer, C. E.: Sewage-Treatment Works, first edition, 1940, McGraw-Hill, New York, p. 318 relied on.

Babbitt, H. E.: Sewerage and Sewage Treatment, sixth edition, 1947, John Wiley & Sons, New York, pp. 472–475 relied on.

MICHAEL E. ROGERS, Primary Examiner

U.S. Cl. X.R.

210—142, 197, 220